United States Patent
Iwahori

(10) Patent No.: US 8,593,101 B2
(45) Date of Patent: Nov. 26, 2013

(54) POWER CONVERTING DEVICE WITH REDUCED SWITCHING LOSS

(75) Inventor: Michio Iwahori, Hino (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 346 days.

(21) Appl. No.: 13/067,666

(22) Filed: Jun. 17, 2011

(65) Prior Publication Data

US 2011/0309778 A1    Dec. 22, 2011

(30) Foreign Application Priority Data

Jun. 18, 2010  (JP) ................................. 2010-138963

(51) Int. Cl.
H02P 27/04    (2006.01)

(52) U.S. Cl.
USPC ........... 318/801; 318/139; 318/140; 318/148; 318/722; 318/800; 180/65.285; 180/65.21; 180/65.29; 363/40; 363/52; 363/61; 363/81; 363/82; 363/108; 363/109; 363/114; 363/120; 363/175

(58) Field of Classification Search
USPC ......... 318/139, 140, 148, 432, 722, 799, 800, 318/801; 180/65.285, 65.21, 65.29; 310/12.12; 320/123, 140; 363/40, 52, 363/61, 81, 82, 86, 87, 95, 98, 108, 109, 363/114, 124, 125, 174, 175
See application file for complete search history.

(56) References Cited

U.S. PATENT DOCUMENTS

| | | | | |
|---|---|---|---|---|
| 7,400,104 B2 * | 7/2008 | Sato | ............................... | 318/376 |
| 7,990,085 B2 * | 8/2011 | Furukawa et al. | ............ | 318/142 |
| 2003/0146726 A1 * | 8/2003 | Ishikawa et al. | .............. | 318/442 |
| 2005/0162023 A1 * | 7/2005 | Habu | ............................ | 307/151 |

FOREIGN PATENT DOCUMENTS

| | | |
|---|---|---|
| JP | 10-191503 A | 7/1998 |
| JP | 2004-112883 A | 4/2004 |

* cited by examiner

*Primary Examiner* — Antony M Paul
(74) *Attorney, Agent, or Firm* — Rabin & Berdo, P.C.

(57) ABSTRACT

A power converting device is disclosed that can reduce switching loss occurring in a voltage source inverter that drives an AC motor. It is possible to supply DC power to the voltage source inverter from both a voltage source rectifier, which converts AC power from an AC generator into DC power, and a battery. A first switching circuit is inserted between the voltage source rectifier and the AC generator, and the battery is connected to the output side of the voltage source rectifier. A second switching circuit is inserted between the battery and the voltage source inverter. A third switching circuit and a reactor are inserted in series between the input side of the voltage source inverter and the input side of the voltage source rectifier. At least one of an upper arm and a lower arm of the voltage source rectifier can be chopper controlled.

8 Claims, 13 Drawing Sheets

FIG. 4

|  | RECTIFIER CIRCUIT | |
| --- | --- | --- |
|  | RECTIFYING ACTION | RECTIFYING ACTION STOPPED |
| Vmt=Vmax | Sc=0 | Sc=0 |
| Vmt<Vmax | Sc=0 | Sc=1 |

POWER CONVERTING DEVICE WITH REDUCED SWITCHING LOSS

CROSS-REFERENCE TO RELATED APPLICATION

This application claims the benefit of priority of Japanese application 2010-138963. filed Jun. 18, 2010. the disclosure of which is incorporated herein by reference.

BACKGROUND OF THE INVENTION

The present invention relates to a power converting device having a voltage inverter that can be supplied with direct current power from both a voltage source rectifier, which converts alternating current power generated by an alternating current generator into direct current power, and a direct current power source circuit, and that drives an alternating current load.

To date, as this kind of power converting device, there is known a control device of a hybrid automobile wherein, for example, a three-phase output of an alternating current generator AG rotationally driven by an engine EG is converted to a direct current by a voltage source rectifier IVg, wherein six arms in which switching elements and diodes are connected in inverse parallel are bridge connected, the direct current output is supplied to a voltage source inverter IVm, wherein six arms in which switching elements and diodes are connected in inverse parallel are bridge connected, and converted to an alternating current, and an alternating current motor AM is driven by the alternating current output, as shown in FIG. 13 (for example, refer to JP-A-10-191503).

Also, an electric load device including a DC-DC converter that converts a first direct current voltage output from a direct current power source into a second direct current voltage whose voltage level differs from that of the first direct current voltage, and first and second electric loads driven by the second direct current voltage, has been proposed (for example, refer to JP-A-2004-112883).

A specific configuration of the electric load device has an alternating current motor M1 that drives a drive wheel, and an alternating current generator M2, driven by an engine, that generates alternating current power, as shown in FIG. 14. The alternating current motor M1 is driven by a voltage source inverter IV1, and the alternating current power generated by the alternating current generator M2 is converted into direct current power by a voltage source rectifier IV2. A smoothing capacitor C is connected between a positive bus bar L1 and a negative bus bar L2 connecting the voltage source inverter IV1 and voltage source rectifier IV2. A direct current chopper CV is connected between the positive bus bar L1 and negative bus bar L2 to which the smoothing capacitor C is connected. The direct current chopper CV, as well as raising the voltage of direct current power of a direct current power source B and supplying it between the positive bus bar L1 and negative bus bar L2, lowers the voltage of direct current power input from the voltage source inverter IV1 and voltage source rectifier IV2, and charges the direct current power source B.

Then, the voltage source inverter IV1, voltage source rectifier IV2, and direct current chopper CV are drive controlled by a control device CD.

In the configuration of JP-A-2004-112883. it is disclosed that, in the configuration of FIG. 14, when the direct current chopper CV, or voltage source inverter IV1 or voltage source rectifier IV2, is stopped in an emergency by the control device CD, the voltage source inverter IV1 or voltage source rectifier IV2 is compulsorily stopped, but a detailed description is omitted.

However, although the alternating current motor AM is driven using the output power of the alternating current generator AG and a direct current power source such as a battery in the heretofore known example described in JP-A-10-191503, a tendency is increasing in systems in which the alternating current generator AG is driven by an internal combustion engine to drive the alternating current motor using, as far as possible, only the direct current power source, for the sake of energy conservation and $CO_2$ reduction. For example, in a hybrid automobile in which an internal combustion engine and an electric drive system are used in tandem, a battery or large capacity capacitor is used as a direct current power source, the capacity of the battery or capacitor is increased, enabling the battery or capacitor to be charged from a distribution system too, and a practical application of a plug-in hybrid automobile that travels (electric vehicle (EV) travel: includes braking time) without activating the internal combustion engine during travel in the region of several tens of kilometers is coming near.

In this way, when an electric vehicle (EV) travels for a long time, the output power of the alternating current generator AG is "0", and normally, the alternating current motor AM continues to be driven or braked by the voltage source inverter, which has the direct current power source as an input, with the rectifier circuit connected to the alternating current generator AG remaining stopped.

Furthermore, in a hybrid automobile called a series-parallel type, one portion of mechanical output torque generated by the internal combustion engine at a time of hybrid travel is transmitted directly to the drive wheel, and at a time of electric vehicle (EV) travel, the output torque transmitted from the internal combustion engine to the drive wheel must also be generated by the alternating current motor AM. For this reason, as the conducting current of the voltage source inverter driving the alternating current motor AM also increases, there is a tendency for loss, such as switching loss, of the voltage source inverter to occur more at a time of electric vehicle (EV) travel than at a time of hybrid travel.

Also, when traveling at low speed, the alternating current voltage necessary in the alternating current motor AM decreases along with a decrease in speed in comparison with the voltage when traveling at medium or high speed, and decreases below the voltage of the battery. In this case, as the voltage of the battery does not decrease, the direct current voltage input into the voltage source inverter is maintained at a high level, and there is also a tendency for switching loss of the switching elements or diodes in the inverter occurring when switching to remain high.

For this reason, it is often the case that inverter loss at low speed travel during electric vehicle (EV) travel is a condition determining a voltage source inverter cooling device, switching frequency, and the like. If it were possible to reduce the input voltage of the voltage source inverter at this kind of low speed travel time, it would be possible to reduce the occurrence of loss of the switching elements and diodes configuring the voltage source inverter, but in the heretofore known example described in JP-A-10-191503. the direct current power source is connected directly to the input side of the voltage source inverter, and it is not possible to lower the inverter input voltage. As a result, the inverter loss during low speed travel increases. Also, there is an unsolved problem in that the configuration of the voltage source inverter increases in size in order to combat this kind of loss.

Also, even in a case in which the direct current chopper circuit CV is provided between the voltage source inverter IV1 and battery B, which is the direct current power source, as in the heretofore known example described in JP-A-2004-112883, although it is possible to carry out a voltage raising action in the direct current chopper circuit CV raising the input voltage of the voltage source inverter IV1 with respect to the battery B, it is not possible to carry out a voltage lowering action lowering the input voltage of the voltage source inverter IV1. For this reason, in the same way as in the heretofore known example described in JP-A-10-191503, it is not possible to reduce the occurrence of inverter loss during low speed travel at a time of electric vehicle (EV) travel, and there is an unsolved problem in that the configuration of the voltage source inverter increases in size.

SUMMARY OF THE INVENTION

Therefore, the invention, having been contrived bearing in mind the unsolved problems of the heretofore known examples, has an object of providing a power converting device that can reduce switching loss occurring in a voltage source inverter without increasing the size of the configuration of the voltage source inverter.

In order to achieve the object, a power converting device according to a first aspect of the invention includes a voltage source inverter that receives a supply of direct current power from at least one of a voltage source rectifier, which converts alternating current power from an alternating current power source into direct current power, and a direct current power source circuit, and drives an alternating current motor. The voltage source rectifier has an upper arm portion and a lower arm portion, each of which has switching elements, a first switching circuit is inserted between an alternating current input terminal of the voltage source rectifier and the alternating current generator, the direct current power source circuit is connected to the output side of the voltage source rectifier, and a second switching circuit is inserted between the direct current power source circuit and the voltage source inverter. Furthermore, a series circuit of a third switching circuit and a reactor is inserted between one direct current input portion on the input side of the voltage source inverter and the alternating current input side of the voltage source rectifier, and the power converting device further includes a rectifier circuit control unit that chopper controls at least one of the upper arm and lower arm of the voltage source rectifier.

Also, in the power converting device according to the first aspect of the invention, the series circuit is configured of a third switching circuit configured of switch portions, one end of each of which is individually connected to the alternating current input side of the voltage source rectifier, whose number is the same as the number of phases on the alternating current input side, and one reactor connected to the mutually connected other ends of the switch portions of the third switching circuit and one direct current input portion on the input side of the voltage source inverter.

Also, in the power converting device according to the first aspect of the invention, the series circuit is configured of a third switching circuit configured of switch portions, individually connected to the alternating current input side of the voltage source rectifier, whose number is the same as the number of phases on the alternating current input side, and reactors, connected in series to the switch portions of the third switching circuit, whose number is the same as the number of switch portions.

Also, a power converting device according to a second aspect of the invention includes a voltage source inverter that receives a supply of direct current power from at least one of a voltage source rectifier, which converts alternating current power generated by an alternating current generator into direct current power, and a direct current power source circuit, and drives an alternating current motor. The voltage source rectifier has an upper arm portion and a lower arm portion, each of which has switching elements, the direct current power source circuit is connected to the output side of the voltage source rectifier, and a second switching circuit is inserted between the direct current power source circuit and the voltage source inverter. Furthermore, a fourth switching circuit is inserted between one direct current input portion on the input side of the voltage source inverter and a neutral point of the alternating current generator, and the power converting device further includes a rectifier circuit control unit that chopper controls at least one of the upper arm and lower arm of the voltage source rectifier.

Also, in the power converting device according to the second aspect of the invention, an auxiliary reactor is inserted in series with the fourth switching circuit.

Also, in the power converting device according to the first aspect of the invention, the direct current power source circuit is configured of a direct current power source connected to the output side of the voltage source rectifier.

Also, in the power converting device according to the first aspect of the invention, the direct current power source circuit is configured of a direct current chopper circuit that chopper controls a direct current power source.

Also, in the power converting device according to the first aspect of the invention, the alternating current generator is linked to an internal combustion engine mounted in a vehicle and rotationally driven, and the alternating current motor rotationally drives a drive wheel of the vehicle.

According to the invention, when an alternating current motor is driven by a direct current power source when the input of an alternating current power source is stopped, a voltage source rectifier that converts alternating current power from the alternating current power source to direct current power is caused to act as a direct current chopper circuit, and when the necessary voltage of the alternating current motor is lower than the voltage of the direct current power source, it is possible to keep the input side voltage of a voltage source inverter lower than the power source voltage of the direct current power source. Because of this, it is possible to reduce switching element loss of the voltage source inverter without increasing the size of the voltage source inverter. Also, it is possible to suppress a leakage current from the alternating current motor that flows accompanying a switching of the switching elements configuring the voltage source inverter, and prevent a noise malfunction of a peripheral electronic instrument.

BRIEF DESCRIPTION OF THE DRAWINGS

FIG. 4 is a diagram showing a chopper action signal setting table;

DETAILED DESCRIPTION OF THE PREFERRED EMBODIMENTS

Hereafter, a description will be given, based on the drawings, of embodiments of the invention.

Figure 1:
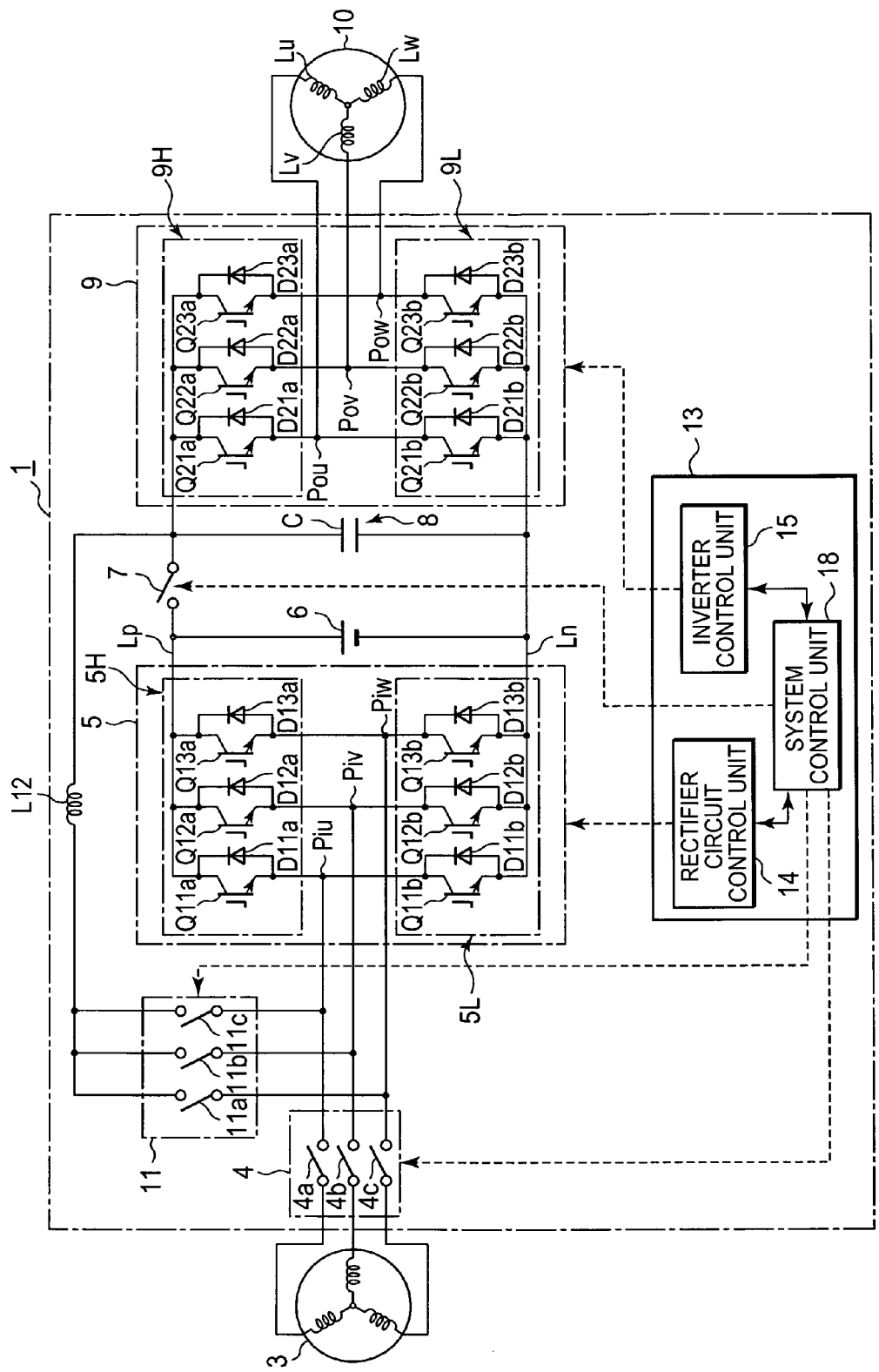
FIG. 1 is a circuit diagram of a power converting device showing a first embodiment of the invention.

FIG. 1 is a block diagram showing a power converting device of a first embodiment of the invention wherein, in the drawing, the reference numeral 1 is a power converting device applicable to an electric vehicle such as a hybrid automobile. The power converting device 1 includes a voltage source rectifier 5 connected via a first switching circuit 4 having switch portions 4a to 4c inserted in each phase of a three-phase alternating current power output from a three-phase alternating current generator 3 to which is transmitted rotative power from the output shaft of an internal combustion engine.

The voltage source rectifier 5 has an AC-DC conversion function of converting alternating current power input via the switching circuit 4 from the alternating current generator 3 into direct current power, and a direct current chopper function, to be described hereafter. The voltage source rectifier 5 is such that an upper arm portion 5H and a lower arm portion 5L are connected between a positive electrode side line Lp and a negative electrode side line Ln.

The upper arm portion 5H has three switching elements Q11a to Q13a configured of, for example, insulated gate bipolar transistors (IGBT), and diodes D11a to D13a connected in inverse parallel to each switching element Q11a to Q13a respectively.

Then, the collector of each switching element Q11a to Q13a is connected to the positive electrode side line Lp, and the emitter is connected to the lower arm portion 5L.

The lower arm portion 5L also has three switching elements Q11b to Q13b configured of, for example, insulated gate bipolar transistors (IGBT), and diodes D11b to D13b connected in inverse parallel to each switching element Q11b to Q13b respectively.

Then, the collector of each switching element Q11b to Q13b is connected to the emitter of the switching elements Q11a to Q13a respectively of the upper arm portion 5H, and the emitter of each switching element Q11b to Q13b is connected to the negative electrode side line Ln.

Then, the alternating current power of the alternating current generator 3 is supplied via the switching circuit 4 to alternating current power input points Piu, Piv, and Piw, which are connection points of the switching elements Q11a to Q13a of the upper arm portion 5H and the switching elements Q11b to Q13b of the lower arm portion 5L.

Also, the power converting device 1 has a battery 6 as a direct current power source circuit configured of a necessary number of battery units connected to the output side of the voltage source rectifier 5.

Furthermore, the power converting device 1 has a direct current portion 8 having a smoothing capacitor C connected via a second switching circuit 7 inserted in the positive electrode side line Lp, and a voltage source inverter 9, on the output side of the battery 6. Herein, the battery 6 is configured of battery units of units of several volts connected in several tens of series, and outputs a battery voltage Vb of several hundred volts.

As the battery voltage Vb is the input voltage of the voltage source inverter 9, a comparatively high voltage, which is necessary when an alternating current motor 10, to be described hereafter, is driven by the voltage source inverter 9 at a comparatively high speed, is selected. By selecting a battery voltage Vb suitable for driving the alternating current motor 10 in other than a low speed region (at a comparatively high speed) in this way, it becomes unnecessary to raise the input voltage of the voltage source inverter 9, and a direct current chopper becomes unnecessary, meaning that it is possible to reduce switching element loss caused by the direct current chopper for raising the voltage.

Also, the voltage source inverter 9 has an upper arm portion 9H and lower arm portion 9L connected in series between the switching circuit 7 and the negative electrode side line Ln.

The upper arm portion 9H has three switching elements Q21a to Q23a configured of, for example, insulated gate bipolar transistors (IGBT), and diodes D21a to D23a connected in inverse parallel to each switching element Q21a to Q23a respectively.

Then, the collector of each switching element Q21a to Q23a is connected to the positive electrode side line Lp, and the emitter is connected to the lower arm portion 9L.

The lower arm portion 9L also has three switching elements Q21b to Q23b configured of, for example, insulated gate bipolar transistors (IGBT), and diodes D21b to D23b connected in inverse parallel to each switching element Q21b to Q23b respectively.

Also, the collector of each switching element Q21b to Q23b is connected to the emitter of the switching elements Q21a to Q23a respectively of the upper arm portion 9H, and the emitter of each switching element Q21b to Q23b is connected to the negative electrode side line Ln.

Then, coils Lu to Lw of the alternating current motor 10 are connected to alternating current power output points Pou, Pov, and Pow, which are connection points of the switching elements Q21a to Q23a of the upper arm portion 9H and the switching elements Q21b to Q23b of the lower arm portion 9L.

Further still, the power converting device 1 is such that a series circuit of a third switching circuit 11 and reactor L12 is inserted between the connection point of the switching circuit 7 and voltage source inverter 9 on the positive electrode side line Lp and the connection points of the switching portions 4a to 4c of the switching circuit 4 and alternating current power input points Piu to Piw of the voltage source rectifier 5.

Herein, the third switching circuit 11 has switching portions 11a to 11c. one end of each of which is individually connected between the switching portions 4a to 4c of the first switching circuit 4 and alternating current power input points Piu to Piw of the voltage source rectifier 5. The other ends of the switching portions 11a to 11c are connected to each other, and are connected via the one reactor L12 to the connection point of the second switching circuit 7 and voltage source inverter 9 on the positive electrode side line Lp.

Then, the first switching circuit 4, voltage source rectifier 5, second switching circuit 7, voltage source inverter 9, and third switching circuit 11 are controlled by a control device 13.

The control device 13 includes a rectifier circuit control unit 14 that drive controls the voltage source rectifier 5, an inverter control unit 15 that drive controls the voltage source inverter 9, and a system control unit 18 that, as well as controlling an overall action of the power converting device 1, that is, a coordination of the rectifier circuit control unit 14 and inverter control unit 15, controls a turning on and off of the switching circuits 4, 7, and 11.

Figure 2:
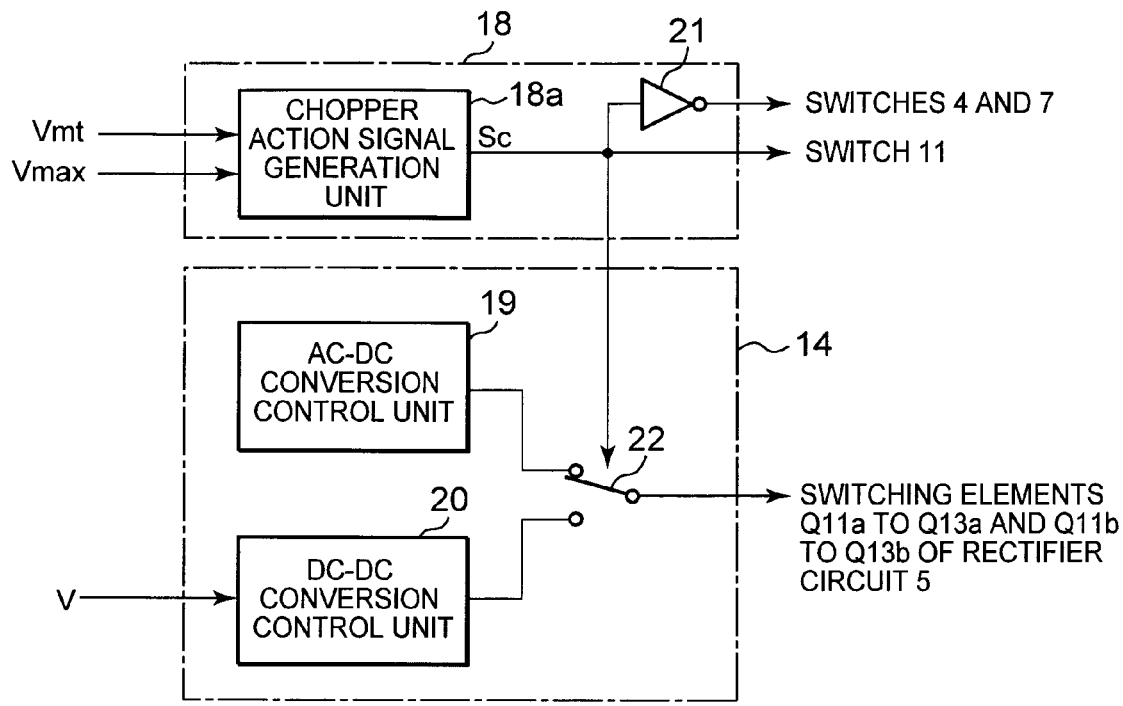
FIG. 2 is a block diagram showing a specific configuration of a rectifier circuit control unit of a control device.

The rectifier circuit control unit 14, as shown in FIG. 2, includes an AC-DC conversion control unit 19 that forms a gate drive signal that rectifies a three-phase alternating current power input from the alternating current generator 3 at a time of a generating action of the alternating current generator 3, and converts it into a direct current power, and a DC-DC conversion control unit 20 that forms a gate drive signal causing the voltage source rectifier 5 to act as a direct current chopper.

Also, a chopper action signal Sc with a logical value of "1" is input from a chopper action signal generation unit 18a of the system control unit 18 into the rectifier circuit control unit 14 when specifying an action condition of the voltage source rectifier 5, that is, that the voltage source rectifier 5 is to be caused to stop the rectifying action, and carry out a chopper action. Furthermore, the rectifier circuit control unit 14 includes a selector switch 22 that, based on the chopper action signal Sc, selects one of the AC-DC conversion control unit 19 and DC-DC conversion control unit 20, and outputs the selection.

Herein, the selector switch 22 selects an output of the AC-DC conversion control unit 19 when the chopper action signal Sc has a logical value of "0", and selects an output of the DC-DC conversion control unit 20 when the chopper action signal Sc has a logical value of "1". Then, the output of the selector switch 22 is supplied to the gate of each switching element Q11a to Q13a and Q11b to Q13b of the voltage source rectifier 5.

Also, in a generating condition in which the alternating current generator 3 is rotationally driven by an internal combustion engine, the AC-DC conversion control unit 19 forms a gate drive signal, for causing the voltage source rectifier 5 to carry out a rectifying action in accordance with the phase of the alternating current power output from the alternating current generator 3, that causes the rectifying action to be carried out by controlling the gate of each switching element Q11a to Q13a and Q11b to Q13b of the voltage source rectifier 5.

Also, the DC-DC conversion control unit 20, when the voltage of the battery 6 is chopper controlled down by the voltage source rectifier 5, forms a gate drive signal that on-off controls all of the switching elements Q11a to Q13a of the upper arm portion 5H, with all of the switching elements Q11b to Q13b configuring the lower arm portion 5L of the voltage source rectifier 5 remaining controlled in a turned off condition.

Herein, when on-off controlling the switching elements in order to cause the voltage source rectifier 5 to carry out a voltage reducing chopper action, a pulse width modulation (PWM) control that turns on or off at a predetermined duty ratio may be carried out, or a control may be carried out whereby the output voltage of the voltage source rectifier 5 is detected, a comparison with a voltage reference value is carried out, and a turning on or off of the switching elements is carried out based on the comparison result. The same also applying in each of the following embodiments, it is possible to apply various control methods as the voltage reducing chopper control method.

Figure 3:
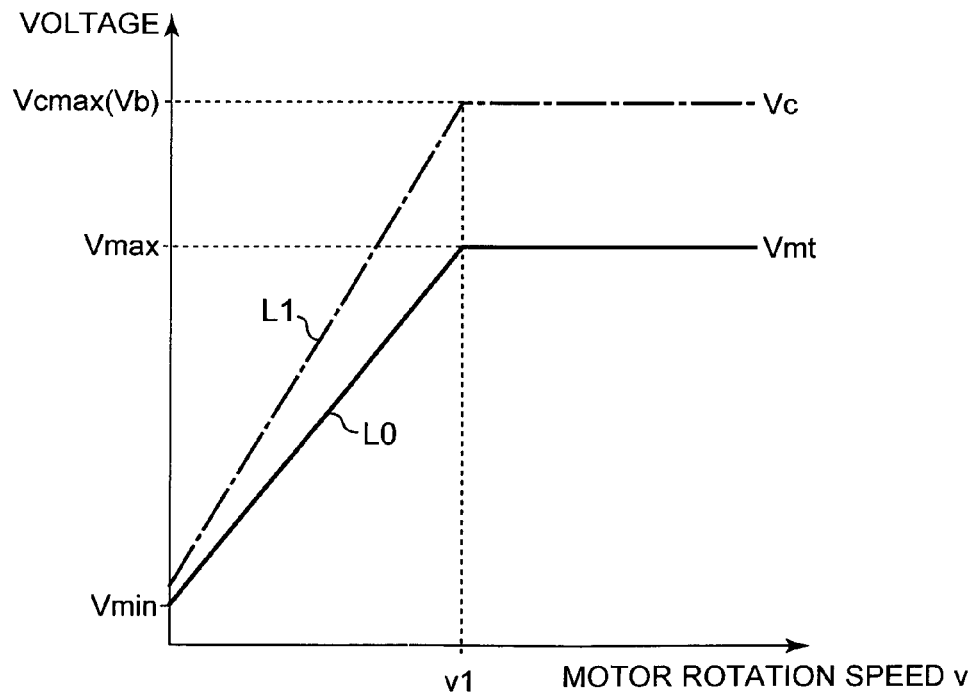
FIG. 3 is a characteristic line diagram showing a relationship between a motor rotation speed v and a motor voltage command value Vmt and direct current voltage Vc.

In the DC-DC conversion control unit 20, a motor rotation speed v at which the alternating current motor 10 is to be driven is input, a direct current voltage of the direct current portion 8, that is, a direct current voltage Vc across the smoothing capacitor C, supplied to the voltage source inverter 9 is calculated based on the motor rotation speed v by referring to the direct current voltage calculation map shown in FIG. 3 stored in a storage unit such as a memory, a voltage reducing gate drive signal is formed whereby the chopper output when the voltage source rectifier 5 is chopper controlled to reduce the voltage becomes the calculated direct current voltage Vc, and the gate drive signal formed is output to the selector switch 22.

Herein, the direct current voltage calculation map is formed based on a motor voltage command value Vmt represented by a characteristic line L0 shown in FIG. 3 as a solid line. The motor voltage command value Vmt is set by the characteristic line L0 shown in FIG. 3 as the solid line. That is, the characteristics set are such that the motor voltage command value Vmt becomes a minimum value Vmin near to "0" when the motor rotation speed v of the alternating current motor 10 is "0", after which, when the motor rotation speed v increases, the motor voltage command value Vmt also increases approximately in proportion therewith, the motor voltage command value Vmt reaches a maximum value Vmax at a predetermined rotation speed v1 at which the motor rotation speed v changes from a low speed region to a medium speed region, and subsequently, the maximum value Vmax is maintained even when the motor rotation speed v increases. Then, the direct current voltage of the direct current portion 8, that is, the direct current voltage Vc across the smoothing capacitor C, supplied to the voltage source inverter 9 is set so as to be a voltage necessary in order to output the motor voltage command value Vmt, or a higher voltage, as shown by a dash-dot line characteristic line L1 in FIG. 3. In accordance with this, the voltage Vb of the battery 6 is set to be a voltage that can provide a maximum voltage Vcmax of the direct current voltage Vc.

The DC-DC conversion control unit 20, not being limited to the case of referring to the direct current voltage calculation map and setting the direct current voltage Vc, may calculate the direct current voltage Vc by compiling an equation representing the characteristic line L1, and substituting the motor rotation speed v in the equation compiled.

The system control unit 18 includes the chopper action signal generation unit 18a that causes the chopper action signal Sc to be generated and, as well as supplying the chopper action signal Sc output from the chopper action signal generation unit 18a directly to the rectifier circuit control unit 14 and switching circuit 11, supplies the chopper action signal Sc to the switching circuits 4 and 7 via a logic inversion circuit 21.

The motor voltage command value Vmt that drives the alternating current motor 10, and the voltage command maximum value Vmax which is the maximum value of the motor voltage command value Vmt, are input into the chopper action signal generation unit 18a. the chopper action signal generation unit 18a sets the chopper action signal Sc, referring to a chopper action signal setting table shown in FIG. 4, based on the relationship between the motor voltage command value Vmt and voltage command maximum value Vmax, and on whether the voltage source rectifier 5 is to be put into a rectifying action condition or a rectifying action stopped condition, and outputs the set chopper action signal Sc.

That is, when controlling the voltage source rectifier 5 into a rectifying action condition, the chopper action signal Sc is set to a logical value of "0" so as to command an AC-DC conversion action, regardless of the value of the motor voltage command value Vmt.

Meanwhile, when controlling the voltage source rectifier 5 into a rectifying action stopped condition, the chopper action signal Sc is set to a logical value of "0" when Vmt=Vmax, and the chopper action signal Sc is set to a logical value of "1" when Vmt<Vmax. However, at the same time as setting the chopper action signal Sc to a logical value of "0" when Vmt=Vmax, all of the gate signals output from the AC-DC conversion control unit 19 are controlled to a turned off condition.

The chopper action signal Sc is supplied to the first switching circuit 4 and second switching circuit 7 via the logic inversion circuit 21, and supplied directly to the third switching circuit 11 and the selector switch 22 of the rectifier circuit control unit 14.

For this reason, when the chopper action signal Sc has a logical value of "0", the first switching circuit 4 and second switching circuit 7 close, and the third switching circuit 11 opens. Meanwhile, when the chopper action signal Sc has a logical value of "1", the first switching circuit 4 and second switching circuit 7 open, and the third switching circuit 11 closes.

The inverter control unit 15, in a powered condition in which the alternating current motor 10 is caused to act as a motor, forms a DC-AC conversion gate drive signal that on-off controls the switching elements Q21$a$ to Q23$a$ configuring the upper arm portion 9H, and switching elements Q21$b$ to Q23$b$ configuring the lower arm portion 9L, of the voltage source inverter 9 in accordance with a necessary motor torque. Also, in a regenerative braking condition using the alternating current motor 10, the inverter control unit 15 forms an AC-DC conversion gate drive signal that causes the voltage source inverter 9 to act as a rectifier circuit, and supplies the signal to the gate of each switching element Q21$a$ to Q23$a$ and Q21$b$ to Q23$b$.

Next, a description will be given of actions of the first embodiment.

Now, in a condition in which the alternating current generator 3 is rotationally driven by an internal combustion engine, and is generating, the chopper action signal Sc output from the chopper action signal generation unit 18$a$ of the system control unit 18 is set to a logical value of "0" by referring to the chopper action signal setting table of FIG. 4. For this reason, an output of the AC-DC conversion control unit 19 is selected by the selector switch 22 of the rectifier circuit control unit 14, and a gate drive signal formed by the AC-DC conversion control unit 19 is output to each switching element Q11$a$ to Q13$a$ and Q11$b$ to Q13$b$ of the voltage source rectifier 5.

Also, the switching circuits 4 and 7 are controlled to a turned on condition, and the switching circuit 11 is controlled to a turned off condition.

Consequently, a rectifying action is carried out in the voltage source rectifier 5, alternating current power output from the alternating current generator 3 is converted into direct current power, which is smoothed by the smoothing capacitor C, and supplied to the voltage source inverter 9.

In the voltage source inverter 9, a gate drive signal whereby a motor voltage and motor current in accordance with a necessary motor torque are obtained is formed in the inverter control unit 15 of the control device 13, and a three-phase alternating current power output from an alternating current output point is output to the alternating current motor 10. Because of this, the alternating current motor 10 is rotationally driven in accordance with the motor voltage command value Vmt, and it is possible, for example, for the alternating current motor 10 to cause a vehicle to move by driving a drive wheel via a power transmission mechanism.

When changing from the condition in which the alternating current motor 3 is rotationally driven, by stopping the alternating current motor 3, to a regenerative braking condition in which braking is done by the alternating current motor 10, the regenerative power of the alternating current motor 10 is input into the voltage source inverter 9. In the regenerative braking condition, the voltage source inverter 9 is controlled by the inverter control unit 15 to carry out the same kind of rectifying action as the voltage source rectifier 5, and the regenerative power is converted into direct current power. The direct current power is smoothed by the smoothing capacitor C, and charges the battery 6.

Next, when setting the chopper action signal Sc output from the chopper action signal generation unit 18$a$ of the system control unit 18 to a logical value of "0" in the condition in which the alternating current motor 3 is stopped, and rotationally driving the alternating current motor 10, all of the gate signals output from the AC-DC conversion control unit 19 of the rectifier circuit control unit 14 are controlled to a turned off condition at the same time. For this reason, the voltage source rectifier 5 takes on an action stopped condition, the voltage Vb of the battery 6 continues to be supplied to the direct current portion 8, and a drive control equivalent to that of a so-called electric vehicle (EV) is carried out. The voltage Vb of the battery 6 is smoothed by the smoothing capacitor C, and supplied to the voltage source inverter 9. Consequently, the alternating current motor 10 can be rapidly rotationally driven at the predetermined rotation speed v1 or above.

Next, a description will be given of a case of setting the chopper action signal Sc output from the chopper action signal generation unit 18$a$ of the system control unit 18 to a logical value of "1" in the condition in which the alternating current motor 3 is stopped, and rotationally driving the alternating current motor 10.

In this case too, a drive control equivalent to that of a so-called electric vehicle (EV), whereby the alternating current motor 10 is rotationally driven by only the voltage Vb of the battery 6, is carried out but, as the speed of the alternating current motor 10 is medium or low, it is a time when the input voltage of the voltage source inverter 9 is lowered. In this case, as the chopper action signal Sc has a logical value of "1", the switching circuits 4 and 7 are controlled to a turned off condition, and the switching circuit 11 is controlled to a turned on condition. At the same time as this, the voltage of the voltage source rectifier 5 is chopper controlled down by the DC-DC conversion control unit 20 of the rectifier circuit control unit 14.

The voltage reducing chopper control, as shown in FIG. 3, is executed by the DC-DC conversion control unit 20 of the rectifier circuit control unit 14 when the motor rotation speed v takes on a condition in which it is lower than the predetermined rotation speed v1, and the motor voltage command value Vmt is less than the voltage command maximum value Vmax. With the voltage reducing chopper control, the direct current voltage Vc lower than the voltage Vb of the battery 6 supplied to the voltage source inverter 9 is calculated based on the motor rotation speed v by referring to the direct current voltage calculation map of FIG. 3.

Then, a voltage reducing gate drive signal is formed whereby the chopper output when the voltage source rectifier 5 is chopper controlled to reduce the voltage becomes the calculated direct current voltage Vc, and the gate drive signal formed is output to the selector switch 22. For this reason, all of the switching elements Q11$a$ to Q13$a$ of the upper arm portion 5H are on-off controlled, with all of the switching elements Q11$b$ to Q13$b$ configuring the lower arm portion 5L of the voltage source rectifier 5 remaining controlled in a turned off condition. Because of this, a direct current voltage lower than the voltage Vb of the battery 6 is output from the voltage source rectifier 5 to the capacitor C side. Although a description has been given of a case in which power is supplied from the battery 6 to the voltage source inverter 9, conversely, when supplying power from the voltage source inverter 9 to the battery 6, and charging the battery 6, it is sufficient that all of the switching elements Q11$b$ to Q13$b$ of the lower arm are on-off controlled, with the switching elements Q11$a$ to Q13$a$ of the upper arm remaining in a turned off condition.

As the low voltage direct current voltage Vc output from the voltage source rectifier 5 is smoothed by the smoothing capacitor C and supplied to the voltage source inverter 9, it is possible to drive the voltage source inverter 9 with a low voltage input in accordance with the motor voltage command value Vmt at the time. By the input voltage of the voltage source inverter 9 being suppressed in this way, it is possible to reduce the element loss (the switching loss, and the like) of the voltage source inverter 9 determined by the product of the input voltage and input current at a time of a switching action, without increasing the size of the voltage source inverter 9.

At the same time as this, by the input voltage of the voltage source inverter 9 being suppressed, it is possible to suppress the amount of heat generated by the switching elements configuring the voltage source inverter 9, and it is possible to simplify a cooling structure that cools the voltage source inverter 9.

Furthermore, as it possible to reduce a leakage current from the alternating current motor 10 that flows accompanying a switching action of the voltage source inverter 9, it is possible to reliably prevent a noise malfunction of a peripheral electronic instrument.

Moreover, as the voltage source rectifier 5 is utilized as a chopper when adjusting the input voltage of the voltage source inverter 9, there is no need to provide a new direct current chopper circuit, and it is possible to simplify the overall configuration.

Figure 5:
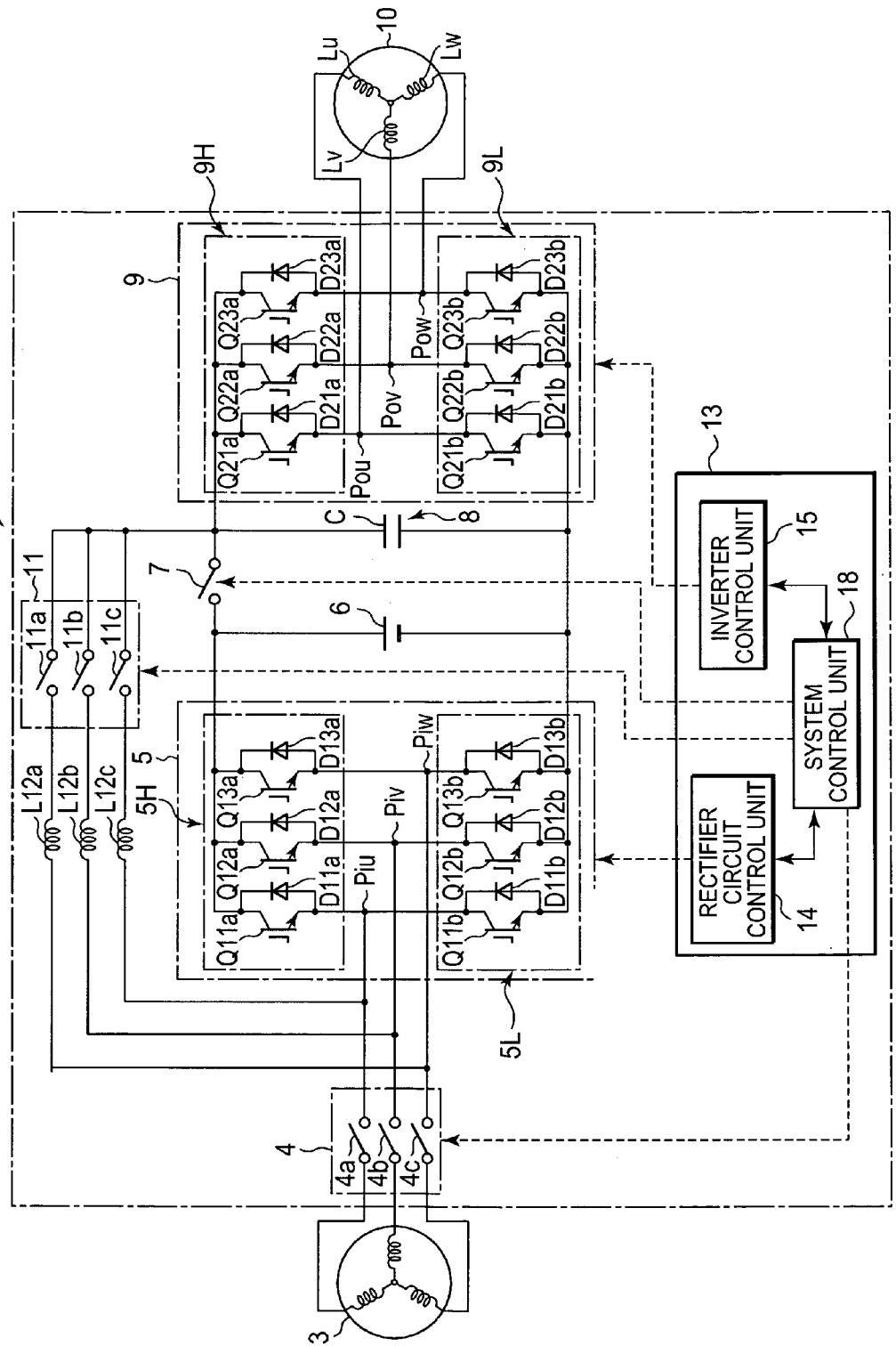
FIG. 5 is a circuit diagram showing a modification example of the first embodiment.

In the first embodiment, a description has been given of a case in which the one reactor L12 is connected in series with the third switching circuit 11 but, not being limited to this, the switch portions 4$a$ to 4$c$ of the switching circuit 4 and the same number of reactors L12$a$ to L12$c$ may be connected in series, as shown in FIG. 5. In this case, one end of each reactor L12$a$ to L12$c$ is individually connected between the first switching circuit 4 and alternating current power input points Piu to Piw of the voltage source rectifier 5. Then, the switching portions 11$a$ to 11$c$ of the third switching circuit 11 are connected to the other ends of the reactors L12$a$ to L12$c$, and the other ends of the switching portions 11$a$ to 11$c$ are connected to each other, and are connected between the second switching circuit 7 and voltage source inverter 9 on the positive electrode side line Lp.

According to this configuration, as the reactors L12$a$ to L12$c$ are individually connected respectively to the alternating current power input points Piu to Piw of the voltage source rectifier 5, there is no need to simultaneously on-off control the on-off controlled three switching elements Q11$a$ to Q13$a$ or Q11$b$ to Q13$b$ configuring the upper arm portion 5H or lower arm portion 5L when the voltage of the voltage source rectifier 5 is chopper controlled up or down, and it is possible to stagger the timing at which the switching elements Q11$a$ to Q13$a$ or Q11$b$ to Q13$b$ are on-off controlled. Because of this, as it is possible to cause the switching elements to act as the same number of multiple chopper circuits as the number of alternating current power input points Piu to Piw of the voltage source rectifier 5, it is possible to make the input voltage ripple of the voltage source inverter 9 equivalent to that of the circuit configuration of FIG. 1, even when lowering the switching frequency of each switching element Q11$a$ to Q13$a$ or Q11$b$ to Q13$b$. and it is possible to reduce the switching loss of the switching elements when causing the voltage source rectifier 5 to carry out a chopper action.

Figure 6:
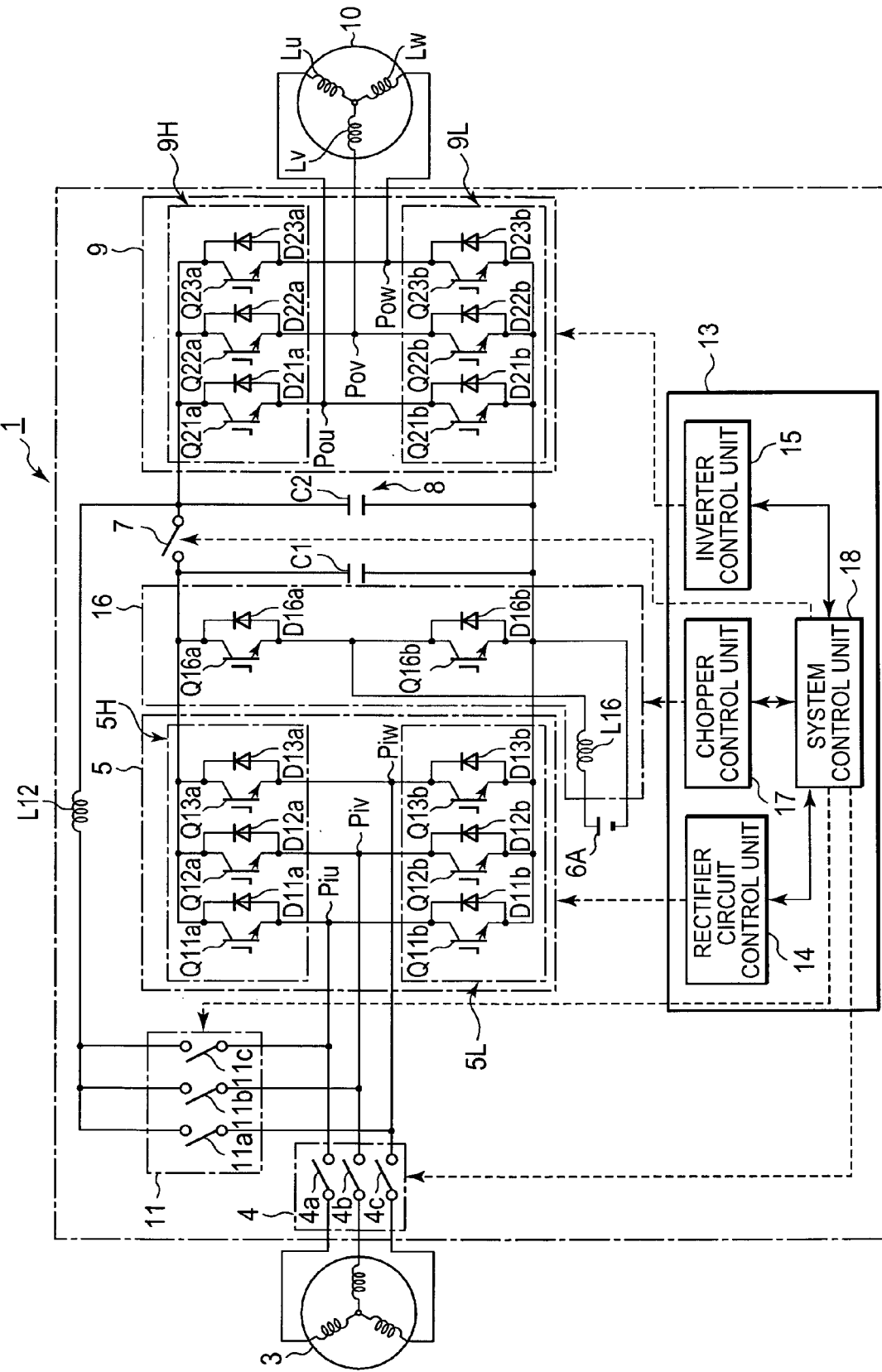
FIG. 6 is a circuit diagram showing another modification example of the first embodiment.

Also, in the first embodiment, a description has been given of a case in which the battery 6 is connected directly to the output side of the voltage source rectifier 5 but, not being limited to this, a direct current chopper circuit 16 may be connected as a direct current power source circuit to the output side of the voltage source rectifier 5, as shown in FIG. 6.

The direct current chopper circuit 16 is such that a pair of switching elements Q16$a$ and Q16$b$ configured of, for example, insulated gate bipolar transistors (IGBT) are connected in series between the positive electrode side line Lp and negative electrode side line Ln. Diodes D16$a$ and D16$b$ are connected in inverse parallel to the switching elements Q16$a$ and Q16$b$ respectively.

Figure 7:
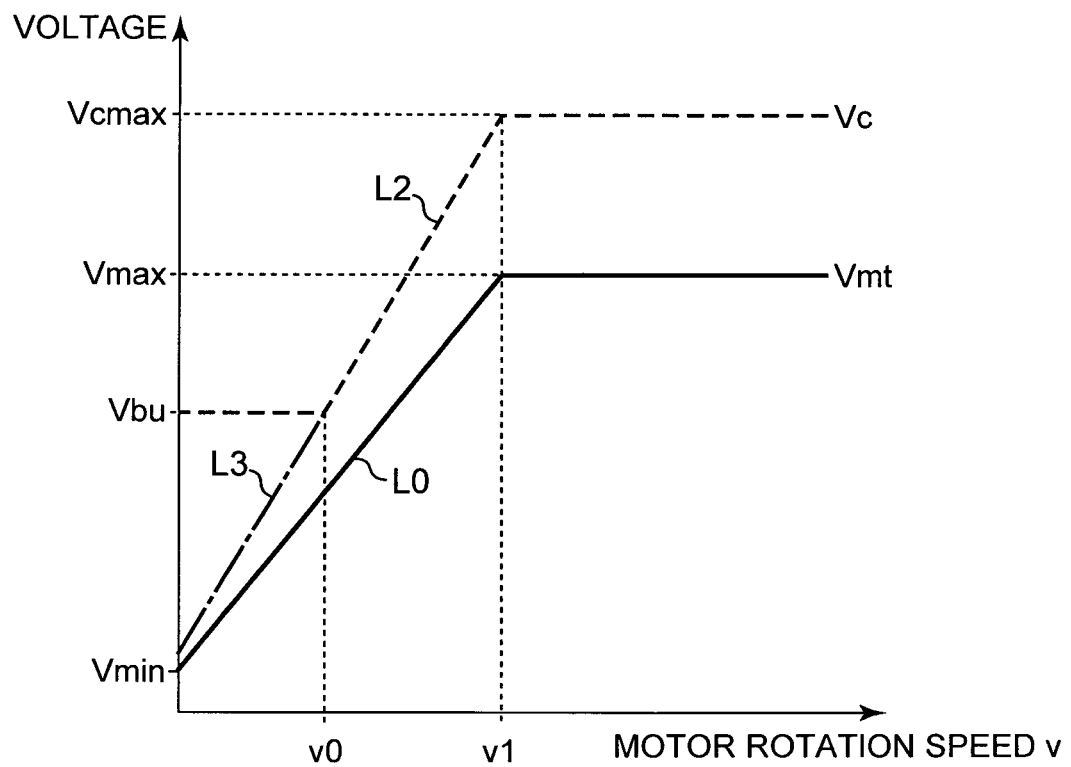
FIG. 7 is a characteristic line diagram showing a relationship between the motor rotation speed v and the motor voltage command value Vmt and direct current voltage Vc in the modification example of FIG. 6.

Then, a series circuit of a battery 6A and reactor L16 is connected as a direct current power source with a battery voltage lower than that of the battery 6 between the connection point of the switching elements Q16$a$ and Q16$b$ and the negative electrode side line Ln. In this case, as shown in FIG. 6, a chopper control unit 17 that drive controls the switching elements Q16$a$ and Q16$b$ configuring the direct current chopper circuit 16 is provided in the control device 13, and in the chopper control unit 17, the voltage of the battery 6A is chopper controlled up when the alternating current motor 10 is driven by the battery 6A, and the voltage of the battery 6A is chopper controlled down to a battery 6A voltage Vbu at a time of a regenerative braking by the alternating current motor 10. Herein, as shown in FIG. 7, the voltage Vbu of the battery 6A is set to be a voltage lower than the maximum value Vcmax of the direct current voltage Vc of the direct current portion 8, for example, a voltage in the region of half the voltage Vb of the battery 6 of FIG. 1, or lower than that.

According to the configuration of FIG. 6, when controlling the switching element 16$a$ of the direct current chopper circuit 16 to a turned on condition, and controlling the switching element 16$b$ to a turned off condition, the condition is such that the direct current power source 6A is connected between the positive electrode side line Lp and negative electrode side line Ln, and the configuration is the same as that of the first embodiment.

For this reason, in a condition in which an engine is driven and alternating current power is output from the alternating current generator 3, the chopper action signal Sc input from the chopper action signal generation unit 18$a$ of the system control unit 18 has a logical value of "0", the switching circuits 4 and 7 are controlled to a closed condition, and the switching circuit 11 to an open condition, and the action is the same as that of the first embodiment.

Next, a description will be given of a case in which the engine is stopped, the output of the alternating current power from the alternating current generator 3 is stopped, and the alternating current motor 10 is driven by the voltage Vbu of the battery 6A.

At this time, when the motor rotation speed v is equal to or greater than a predetermined rotation speed v0 and less than v1, as shown in FIG. 7, the direct current voltage Vc calculated by the motor voltage command value Vmt is equal to or greater than the voltage Vbu of the battery 6A. In this case, Sc is set to a logical value of "0" in the chopper action signal generation unit, a gate drive signal whereby the chopper output of the direct current chopper circuit 16 becomes the direct current voltage Vc is formed in the chopper control unit 17, and the gate drive signal is output to the direct current chopper circuit 16.

Consequently, in the direct current chopper circuit 16, when power is supplied from the battery 6A to a capacitor C1 side, the switching element Q16a is controlled to be always off, the switching element Q16b is on-off controlled in accordance with the direct current voltage Vc, and the condition is such that the voltage is chopper controlled up and the direct current voltage Vc is output. The direct current voltage Vc output from the direct current chopper circuit 16 is smoothed by smoothing capacitors C1 and C2, and supplied to the voltage source inverter 9. As a result of this, the alternating current motor 10 is rotationally driven by alternating current power output from the voltage source inverter 9.

Conversely, when power is supplied from the capacitor C1 side to the battery 6A, charging the battery 6A, the switching element Q16b is controlled to be always off, the switching element Q16a is on-off controlled in accordance with the direct current voltage Vc, the voltage is chopper controlled down, and a charging voltage lower than the direct current voltage Vc is output.

However, when the rotation speed of the alternating current motor 10 is low, the motor voltage command value Vmt is low, and the direct current voltage Vc calculated based on the motor voltage command value Vmt is lower than the voltage Vbu of the battery 6A, the switching element 16a of the direct current chopper circuit 16 is controlled to a turned on condition, and the switching element 16b is controlled to a turned off condition. Because of this, the condition is such that the direct current power source 6A is connected between the positive electrode side line Lp and negative electrode side line Ln, in the same way as in the first embodiment. At this time, by Sc being set to a logical value of "1" in the chopper action signal generation unit, and the same process as that of the first embodiment being carried out, the switching elements Q11a to Q13a of the voltage source rectifier 5 are simultaneously put into a turned off condition, the switching elements Q11b to Q13b are on-off controlled in accordance with the direct current voltage Vc, and a chopper control is carried out whereby power is supplied to the voltage source inverter 9, with a voltage lower than that of the voltage Vbu of the battery 6A. Conversely, when power is supplied from the voltage source inverter 9 to the battery 6A with the voltage increased, charging the battery 6A, it is sufficient that the switching element Q16b is in a condition in which it is always off, and the switching element Q16a is on-off controlled in accordance with the direct current voltage Vc. Owing to the chopper control, by the direct current voltage Vc lower than the voltage Vbu of the battery 6A, shown by a dot-dash line characteristic line L3 in FIG. 7, being supplied to the smoothing capacitor C2, the direct current voltage smoothed by the smoothing capacitor C2 is supplied to the voltage source inverter 9.

That is, when providing the direct current chopper circuit 16, the voltage source rectifier 5 is chopper controlled to reduce the voltage when the motor rotation speed v is at or lower than the predetermined rotation speed v0, which is lower than the predetermined rotation speed v1, as shown in FIG. 7. This point differs from the motor rotation speed v being the predetermined rotation speed v1 or lower, as in the first embodiment.

For this reason, the input voltage is reduced below the voltage Vbu of the battery 6A in the voltage source inverter 9, and it is possible to suppress element loss (switching loss, and the like) in the voltage source inverter 9 at a time of a switching action, in the same way as in the first embodiment. In this case, as it is possible to stop the chopper control in the direct current chopper circuit 16, and instead lower the inverter voltage below the battery voltage with the voltage source rectifier 5, there is little fluctuation in element loss between the two, and the element loss suppression effect of reducing the input voltage of the voltage source inverter 9 increases. Moreover, it is possible to suppress the amount of heat generated by each switching element Q21a to Q23a and Q21b to Q23b configuring the voltage source inverter 9 at a low rotation speed requiring a large torque in the alternating current motor 10. Consequently, it is possible to simplify the cooling structure that cools the voltage source inverter 9, and it is possible to reduce the size of the overall configuration of the voltage source inverter 9.

Figure 8:
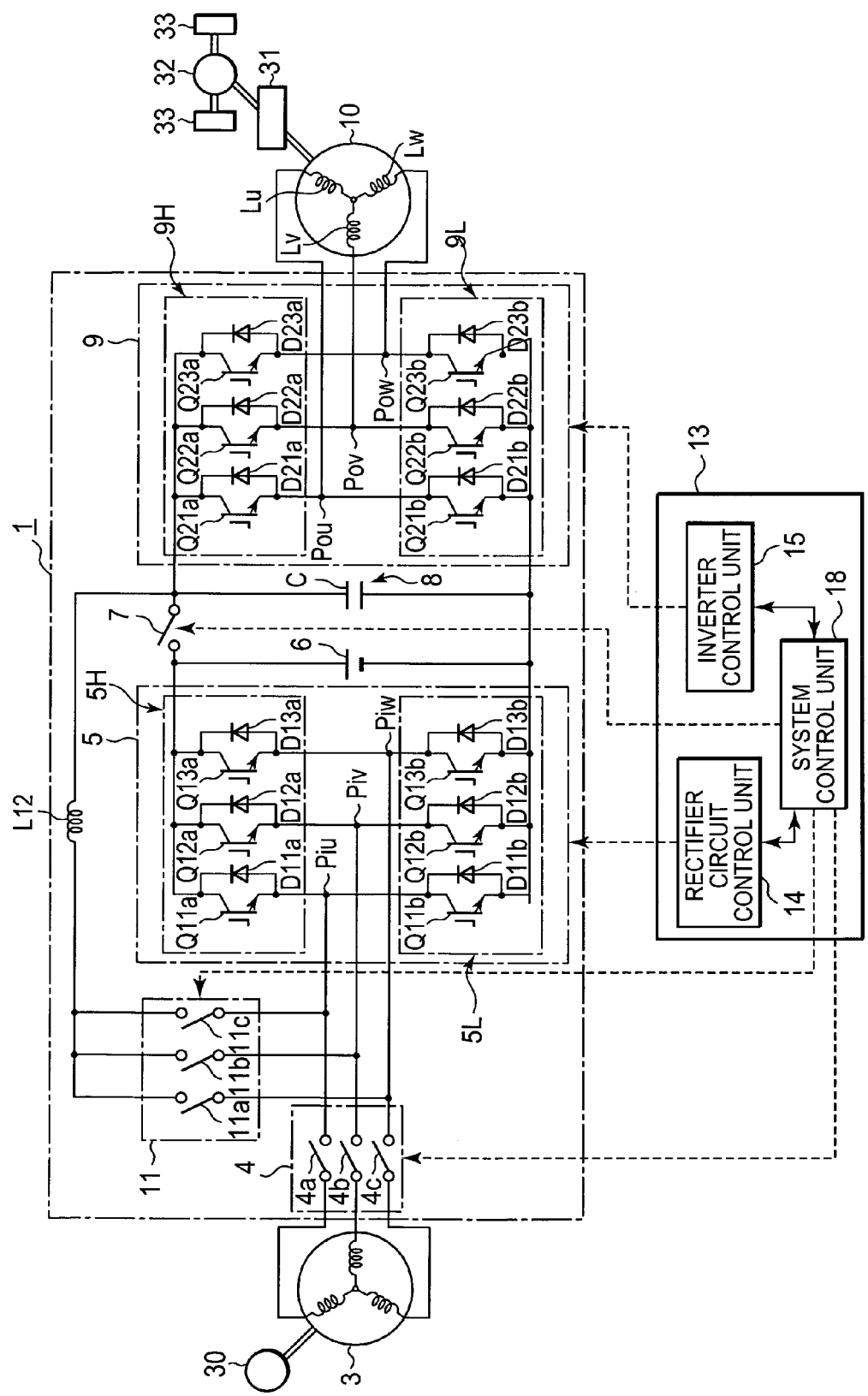
FIG. 8 is a circuit diagram showing still another modification example of the first embodiment.

Furthermore, when configuring an electric vehicle such as a hybrid automobile utilizing the configuration of the first embodiment, it is sufficient that, while the alternating current generator 3 is linked to an internal combustion engine 30, and the rotational drive force of the internal combustion engine 30 is transmitted to the alternating current generator 3, the output shaft of the alternating current motor 10 is linked via, for example, a deceleration mechanism 31 to a differential gear 32, and left and right drive wheels 33 are linked to the differential gear 32, as shown in FIG. 8. Herein, the internal combustion engine 30 and alternating current motor 10 may be linked directly, or the internal combustion engine 30 and alternating current motor 10 may be connected in parallel to a power splitting mechanism configured of, for example, a planetary gear mechanism, and the alternating current generator 3 linked to the power splitting mechanism.

Next, a description will be given, based on FIG. 9, of a second embodiment of the invention.

The second embodiment is such that a chopper action is carried out utilizing the coil inductance of an alternating current generator 3.

Figure 9:
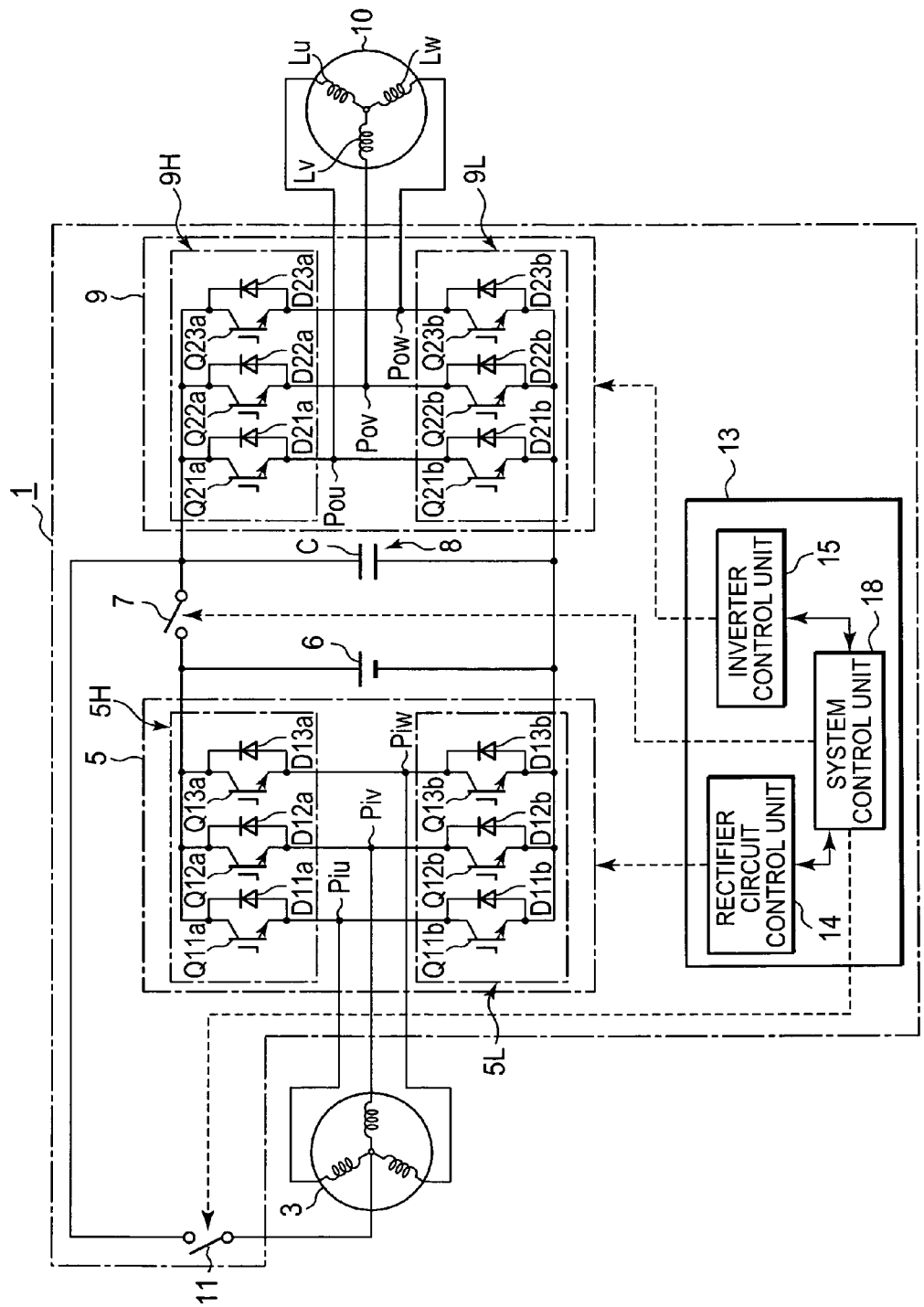
FIG. 9 is a circuit diagram showing a second embodiment of the invention.

That is, in the second embodiment, with the exception of the point that the connection point of the second switching circuit 7 and voltage source inverter 9 on the positive electrode side line Lp in the configuration of FIG. 1 in the first embodiment is connected to a neutral point of the alternating current generator 3 via a third switching circuit 11, as shown in FIG. 9, the configuration is the same as that of the first embodiment. Consequently, portions in FIG. 9 corresponding to FIG. 1 are given the same reference numerals and signs, and a detailed description thereof is omitted.

According to the second embodiment, it is possible to carry out a rectifying action by drive controlling each switching element Q11a to Q13a and Q11b to Q13b of a voltage source rectifier 5 with a gate drive signal of an AC-DC conversion control unit 19 of a rectifier circuit control unit 14 of a control device 13.

Also, as it is possible to use the coil inductance of the alternating current generator 3 as a reactor, it is possible to carry out a chopper action by drive controlling each switching element Q11a to Q13a and Q11b to Q13b of the voltage source rectifier 5 with a gate drive signal of a DC-DC conversion control unit 20 in the rectifier circuit control unit 14 of the control device 13. For this reason, it is possible to obtain the same kind of operational effect as in the first embodiment with the second embodiment too.

Moreover, in the second embodiment, as it is possible to omit the first switching circuit 4 and reactor, it is possible to simplify the overall configuration of the power converting device 1.

Herein, when applying a permanent magnet synchronous motor as the alternating current generator 3, a case can be supposed wherein the alternating current generator 3 rotates even when the voltage source rectifier 5 is stopped. In this case, when causing the voltage source rectifier 5 to carry out a chopper action, for example, an offset alternating current voltage with the same voltage, frequency, and phase as an induced voltage generated by the alternating current generator 3 is generated at the input side of the voltage source rectifier 5, and the output power from the alternating current generator 3 is controlled to "0". Furthermore, it is possible to realize a chopper action by switching the three simultaneously turned on switching elements Q11a to Q13a (or Q11b to Q13b) of an upper arm portion 5H (or lower arm portion 5L) of the voltage source rectifier 5 while the offset alternating current voltage is being generated so that the up-down order thereof is reversed.

Figure 10:
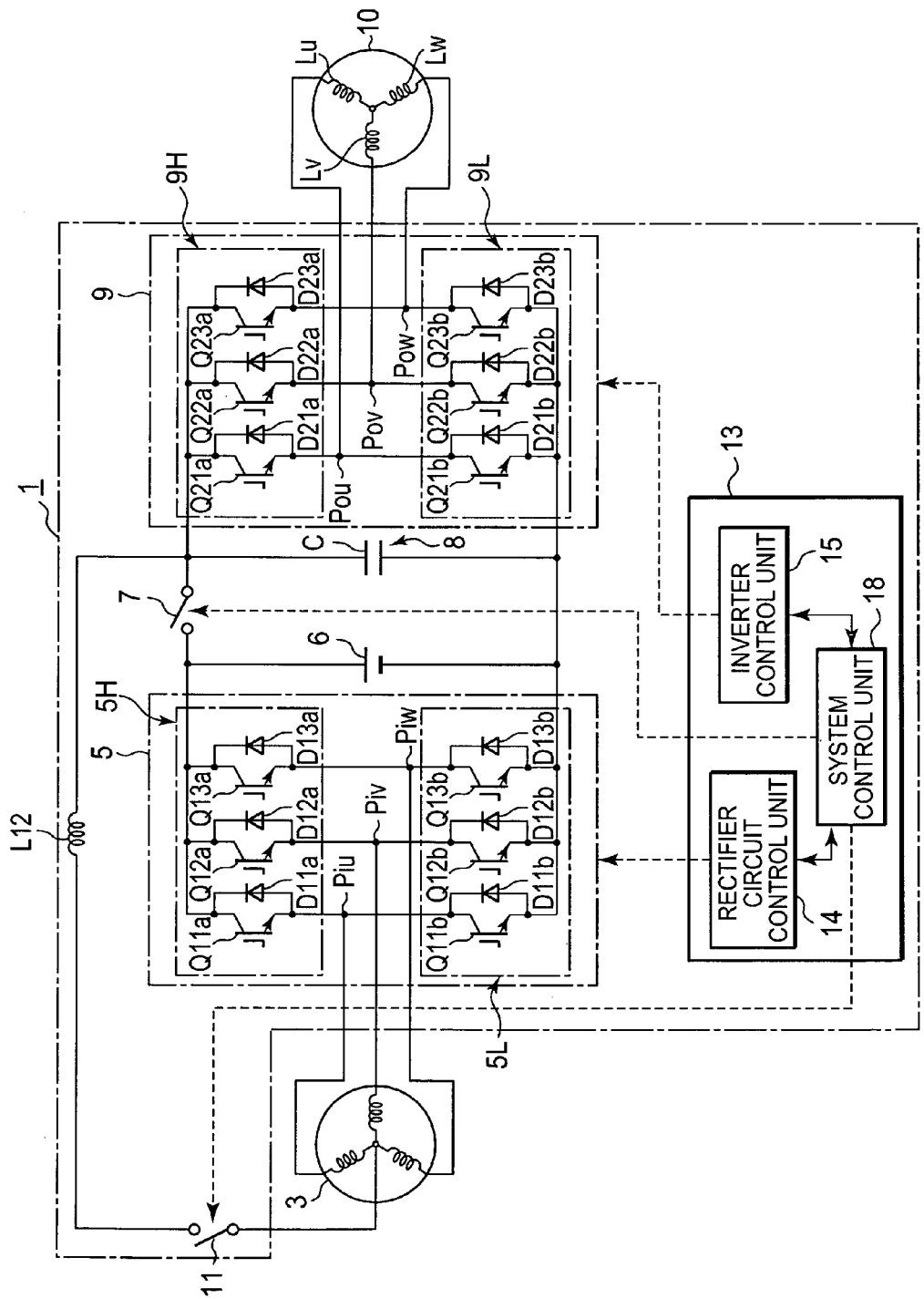
FIG. 10 is a circuit diagram showing a modification example of the second embodiment.

In the second embodiment, when inductance is insufficient with only the coil inductance of the alternating current generator 3, it is necessary to increase the switching frequency of each switching element Q11a to Q13a and Q11b to Q13b of the voltage source rectifier 5 caused to carry out a chopper action. In this kind of case, it is sufficient to insert an auxiliary reactor L12 in series with the switching circuit 11, as shown in FIG. 10. By inserting the auxiliary reactor L12, there is no need to cause the switching elements Q11a to Q13a and Q11b to Q13b of the voltage source rectifier 5 to switch at an unnecessarily high frequency, it is possible to reduce element loss (switching loss, and the like) of the voltage source rectifier 5, and it is possible to reduce the size.

Figure 11:
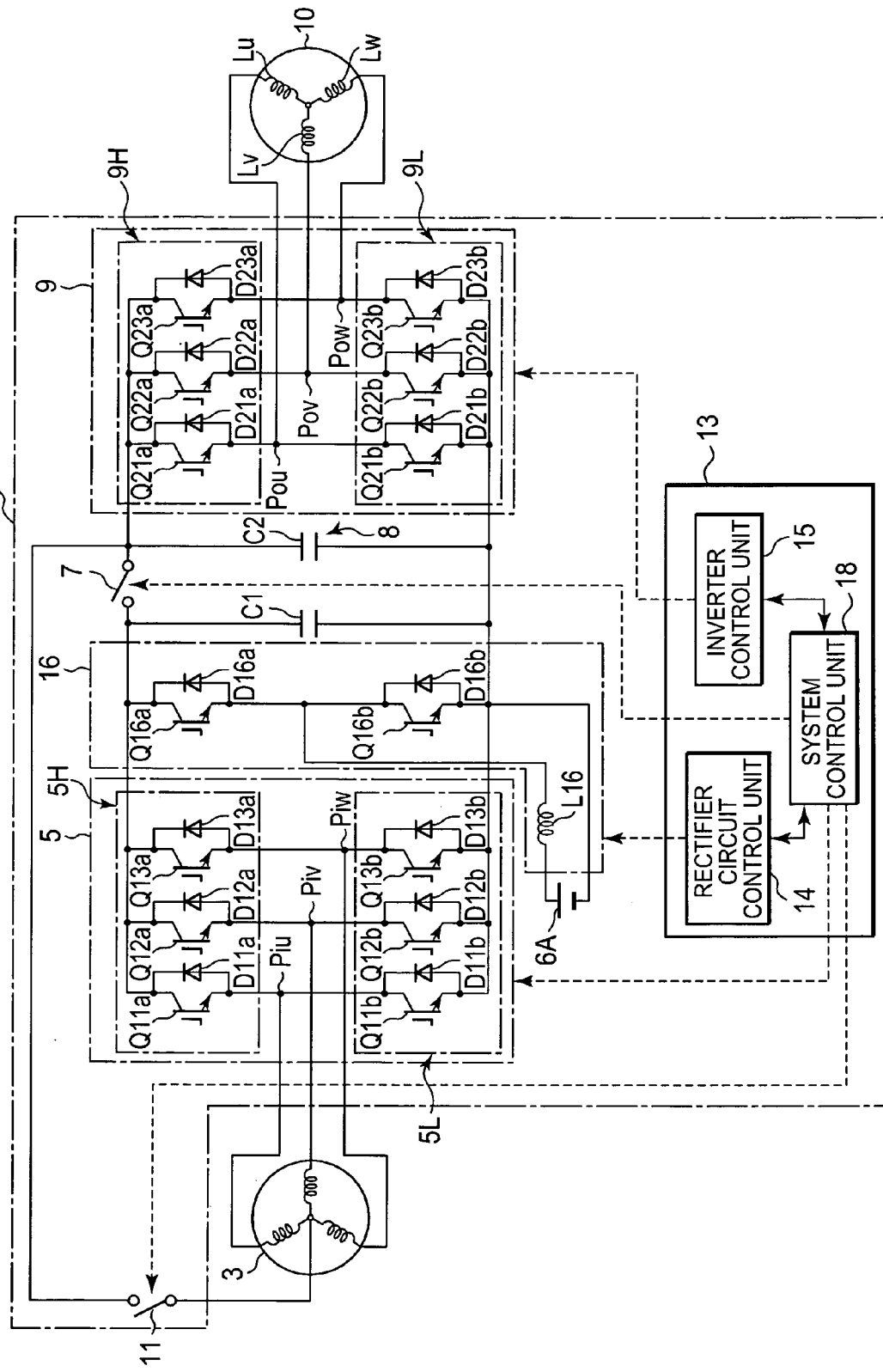
FIG. 11 is a circuit diagram showing another modification example of the second embodiment.

Also, in the second embodiment too, the battery 6 acting as a direct current power source may be omitted, and the same kind of direct current chopper circuit 16 as in FIG. 6 applied instead, as shown in FIG. 11.

Figure 12:
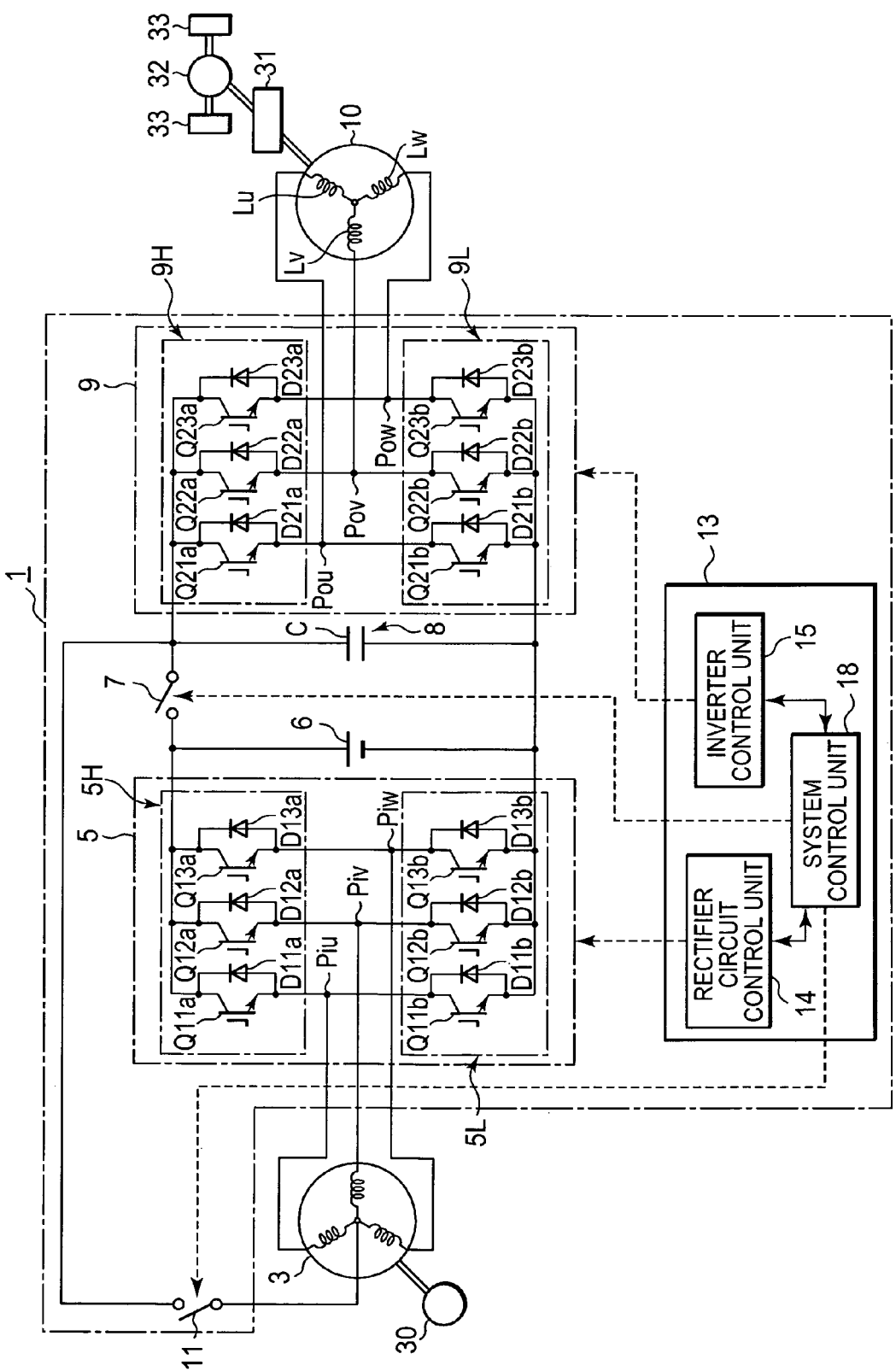
FIG. 12 is a circuit diagram showing still another modification example of the second embodiment.
Figure 13:
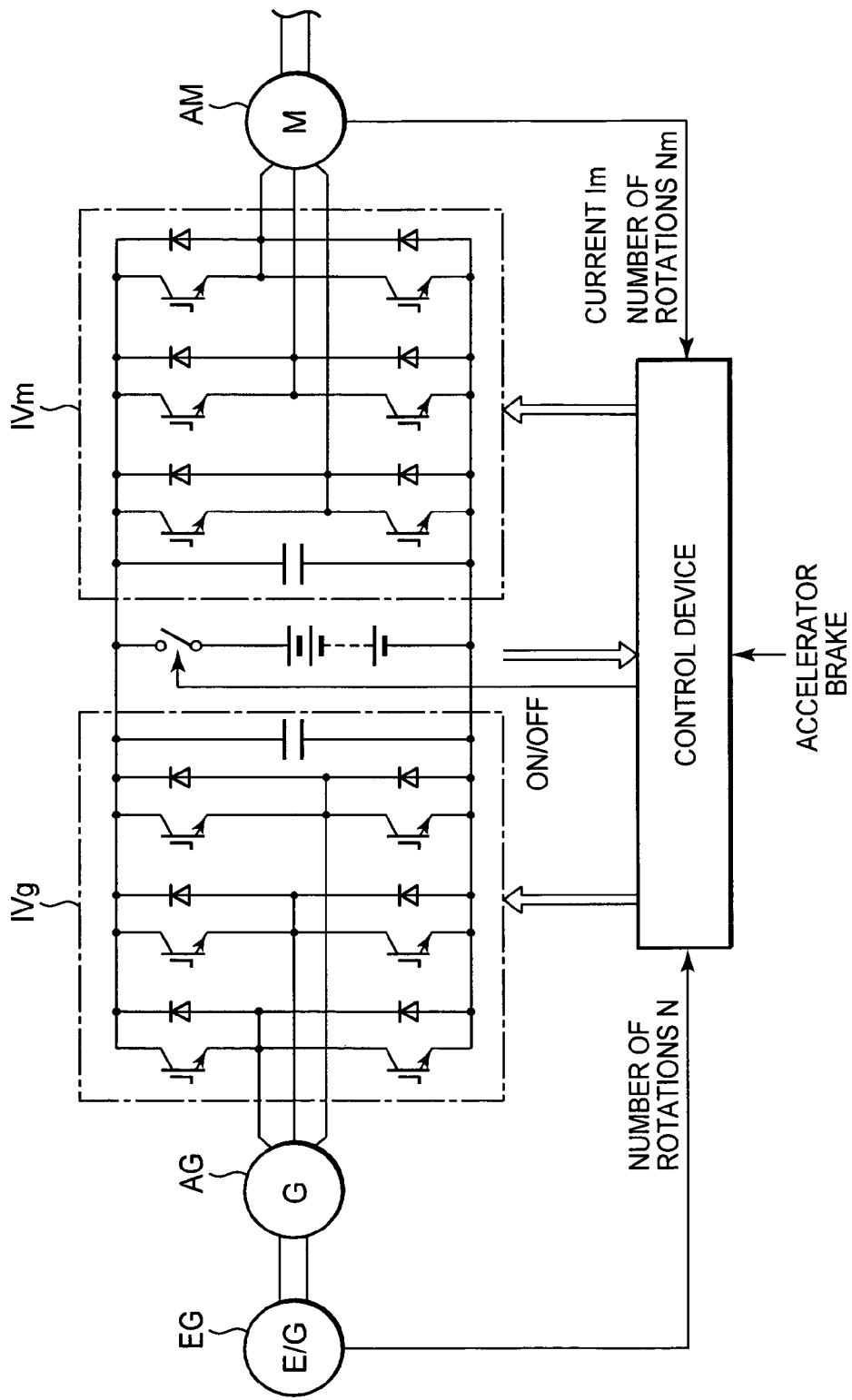
FIG. 13 is a circuit diagram showing a heretofore known example.
Figure 14:
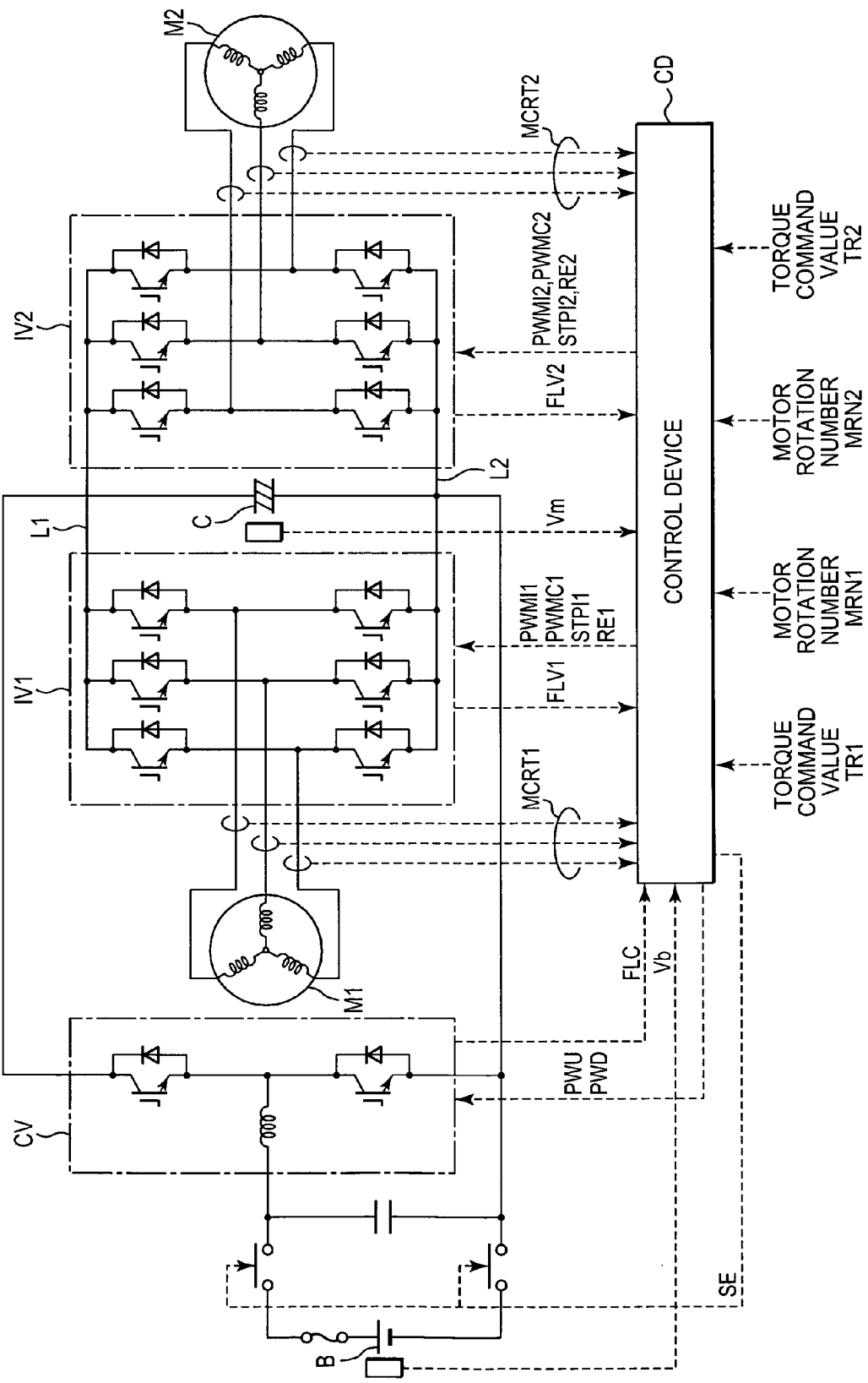
FIG. 14 is a circuit diagram showing another heretofore known example.

Also, when configuring an electric vehicle such as a hybrid automobile utilizing the configuration of the second embodiment, it is sufficient that, while the alternating current generator 3 is linked to an internal combustion engine 30, and the rotational drive force of the internal combustion engine 30 is transmitted to the alternating current generator 3, the output shaft of the alternating current motor 10 is linked via, for example, a deceleration mechanism 31 to a differential gear 32, and left and right drive wheels 33 are linked to the differential gear 32, as shown in FIG. 12. Herein, the internal combustion engine 30 and alternating current motor 10 may be linked directly, or the internal combustion engine 30 and alternating current motor 10 may be connected in parallel to a power splitting mechanism configured of, for example, a planetary gear mechanism, and the alternating current generator 3 linked to the power splitting mechanism.

Also, in the first and second embodiments, a description has been given of a case in which a battery is applied as a direct current power source but, not being limited to this, it is also possible to apply a large capacity capacitor for charging and discharging.

Also, in the first and second embodiments, a description has been given of a case in which insulated gate bipolar transistors (IGBT) are applied as the switching elements of the voltage source rectifier 5, voltage source inverter 9, and direct current chopper circuit 16 but, not being limited to this, it is possible to apply any switching element, such as a power MOSFET, in accordance with the power used.

Also, in the first and second embodiments, a description has been given of a case in which the invention is applied to an electric vehicle such as a hybrid automobile but, not being limited to this, it is possible to apply the invention to any motor drive device that drives an alternating current motor.

Furthermore, in the first and second embodiments, a description has been given of a case in which the alternating current generator 3 and alternating current motor 10 use a three-phase alternating current but, not being limited to this, it is also possible to use a multi-phase alternating current of four phases or more, such as in a brushless motor.

Also, in the first and second embodiments, a description has been given of a case in which alternating current power is supplied from the alternating current generator 3 to the voltage source rectifier 5 but, not being limited to this, it is also possible to adopt a plug-in type of hybrid automobile, electric automobile, or the like, wherein the alternating current input points Piu to Piw of the voltage source rectifier 5 are connected to an alternating current power source such as a commercial alternating current power source.

What is claimed is:

1. A power converting device for use with an AC power source, a DC power source, and an AC motor, comprising:
   a voltage source rectifier that converts alternating current power from the AC power source into direct current power, the voltage source rectifier having an input side and having an output side that is coupled to the DC power source, the voltage source rectifier additionally having upper and lower arm portions with switching elements;
   first switch means for switchably coupline the AC power source to the input side of the voltage source rectifier;
   a voltage source inverter that receives direct current power from at least one of the voltage source rectifier and the DC power source and that drives the AC motor, the voltage source inverter having an input side;
   second switch means for switchably coupling the output side of the voltage source rectifier and the input side of the voltage source inverter;
   a series circuit that includes at least one reactor and third switch means for switchably coupline the at least one reactor between the input side of the voltage source rectifier and the input side of the voltage source inverter; and
   control means for selectively chopper controlling at least one of the upper and lower arm portions of the voltage source rectifier.

2. The power converting device of claim 1,
   wherein the AC power source has n phase output terminals, n being a predetermined number,
   wherein the at least one reactor is a single reactor that is connected to the input side of the voltage source inverter, and
   wherein the third switch means comprises n switch portions, each having an end that is connected to a respective one of the phase output terminals and another end that is connected to the reactor.

3. The power converting device of claim 1,
   wherein the AC power source has n phase output terminals, n being a predetermined number,
   wherein the at least one reactor comprises n reactors, and
   wherein the third switch means comprises n switch portions, each being connected to a respective one of the reactors.

4. The power converting device of claim 1, wherein the DC power source comprises at least one of a capacitor and a battery.

5. The power converting device of claim 1, wherein the DC power source comprises a battery and a direct current chopper circuit that chopper controls the battery.

6. The power converting device of claim 1, wherein the AC power source is a generator that is linked to an internal combustion engine mounted on a vehicle, and the AC motor drives at least one wheel of the vehicle.

7. The power converting device of claim 6, further comprising a reactor connected to the further switch means.

8. A power converting device for use with an AC generator having a neutral point terminal, a DC power source, and an AC motor, comprising:
- a voltage source rectifier that converts alternating current power from the AC power source into direct current power, the voltage source rectifier having an input side and having an output side that is connected to the battery, the voltage source rectifier additionally having upper and lower arm portions with switching elements;
- a voltage source inverter that receives direct current power from at least one of the voltage source rectifier and the DC power source and that drives the AC motor, the voltage source inverter having an input side;
- switch means for switchably coupline the output side of the voltage source rectifier and the input side of the voltage source inverter;
- further switch means for switchably coupling the neutral point terminal of the AC generator and the input side of the voltage source inverter, and
- control means for selectively chopper controlling at least one of the upper and lower arm portions of the voltage source rectifier.

* * * * *